Dec. 15, 1970  H. E. TRUETT  3,546,963
REAR VIEW MIRROR FOR TRUCKS
Filed Oct. 28, 1968  2 Sheets-Sheet 1

INVENTOR
HENRY E. TRUETT

Attorney

Dec. 15, 1970     H. E. TRUETT     3,546,963
REAR VIEW MIRROR FOR TRUCKS
Filed Oct. 28, 1968     2 Sheets-Sheet 2
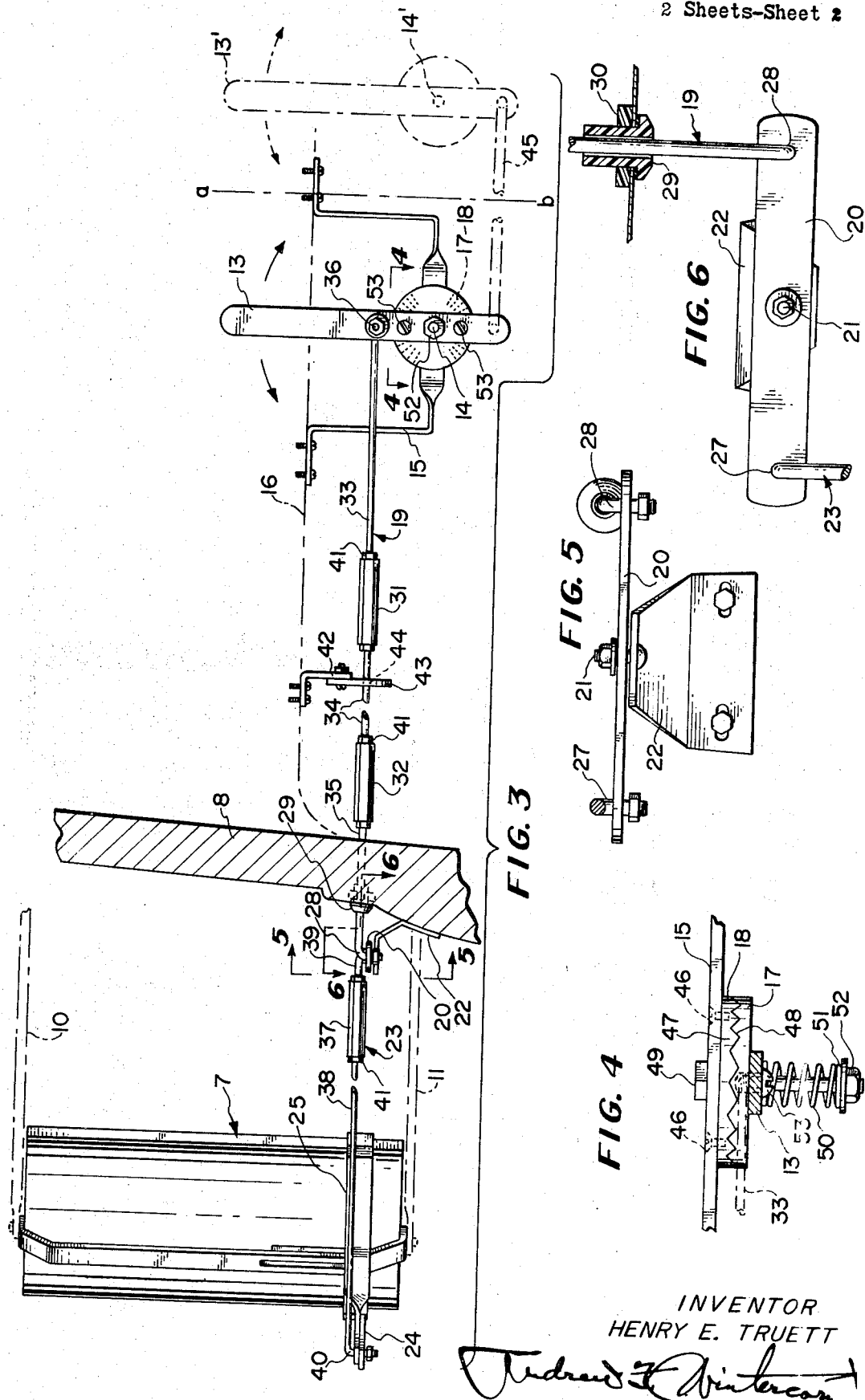
INVENTOR
HENRY E. TRUETT
Attorney

United States Patent Office 3,546,963
Patented Dec. 15, 1970

3,546,963
REAR VIEW MIRROR FOR TRUCKS
Henry E. Truett, 1206 N. Horace Ave.,
Rockford, Ill. 61103
Filed Oct. 28, 1968, Ser. No. 770,925
Int. Cl. G05g 1/00; F16h 21/44
U.S. Cl. 74—503
11 Claims

ABSTRACT OF THE DISCLOSURE

The right-hand rear view mirror is pivoted on a vertical axis on a pair of vertically spaced standoff brackets mounted on the outer side of the truck's right-hand door. A hand-operable lever is pivoted on a horizontal axis on the instrument board and has an adjustable length link connection with one end of a rocker arm pivotally mounted on a bracket on the truck body near the mirror, the other end of the rocker arm being connected by an adjustable length with a bracket fixed to the back of the mirror.

This invention relates to rear view mirrors for trucks, namely, the ones mounted on the right-hand side of the cab, adjustable from the driver's seat, so as to enable safe entry into a cross-road making a left-hand turn at a Y-junction, such turns having been particularly dangerous with nothing better than was available heretofore, namely, one or more rear view mirrors of the fixed variety or adjustably fixed variety.

I am aware of other devices proposed heretofore to meet this problem, but all that I have seen are objectionable for one reason or another, the principal objection being that when provision is made for pivotal adjustment, to enable swinging the mirror from its normal rear view position to cope with the left turn needs, the result is that the mirror is too loose for any good use in its normal rear view position.

It is therefore the principal object of my invention to provide a mirror swivelled on a vertical axis, operable by a rigid link connection with one end of a sufficiently rigid rocker arm pivotally mounted intermediate its ends on the outside of the cab and having its other end operable by means of another rigid link extending to a hand lever disposed within easy reach of the driver from his seat in the left-hand side of the cab, this lever being swingable with a ratchet disk that is spring-pressed toward a fixed ratchet disk so as to enable holding the adjustable rear view mirror well enough in its adjusted position so that there is no danger of its vibrating or even changing position due to vibration in driving over rough roads, while still permitting easy manual resetting of the rear view mirror to suit the driver.

With an additional link connection provided between the manually operable lever just referred to, disposed to the right of the driver's seat, with another lever disposed to the left of the driver's seat, on the other side of the steering column, the mirror may be adjusted by the driver with either hand. The rocker arm mounted on the right-hand side of the cab is preferably so disposed in relation to the substantially vertical hinging hinging axis of the right-hand door that very little if any change in the setting of the rear view mirror is involved in the opening and closing of the right-hand door.

The invention is illustrated in the accompanying drawings, in which:

FIG. 3 is a cross-section on the line 3—3 of FIG. 2 showing at the right-hand end of the view how, with tandem control levers linked together on opposite sides of the steering column, the operation may be right or left-handed as the driver prefers, and FIGS. 4 to 6 are sectional details on the correspondingly numbered lines of FIG. 3.

The same reference numerals are applied to corresponding parts throughout the views.

Figure 1:
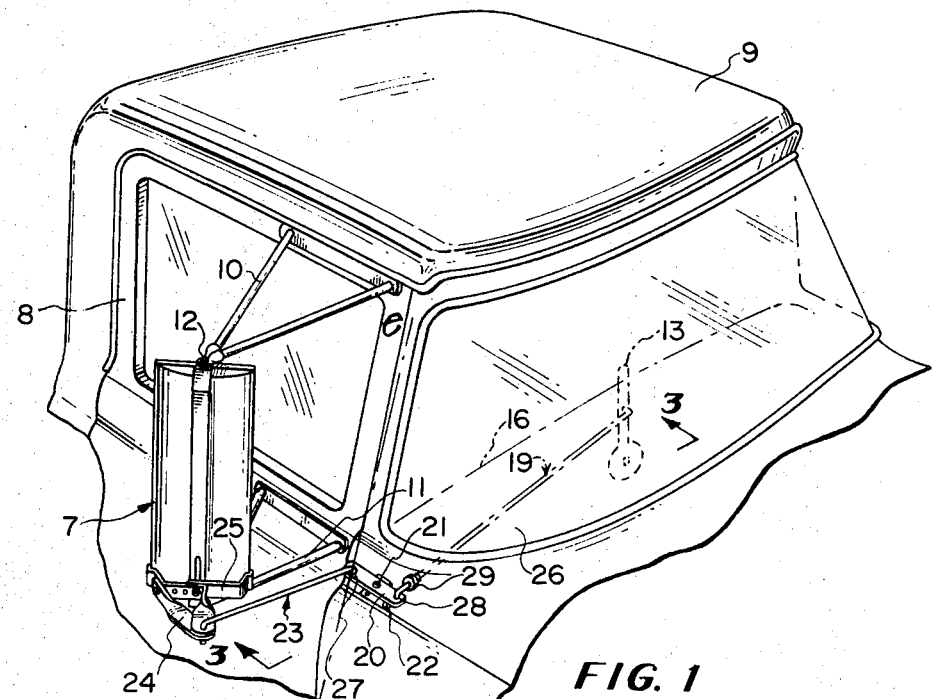
FIG. 1 is a perspective showing a typical installation of a rear view mirror on the right side of a truck cab in accordance with my invention.

Referring to the drawings, the reference numeral 7 designates the right-hand rear view mirror mounted on the outside of the right-hand door 8 of the cab 9 of a truck on a pair of rigid standoff brackets 10 and 11 to pivot on a substantially vertical axis, as indicated at 12. Heretofore, in the large majority of cases this rear view mirror has been set in a fixed position to suit the driver for straight ahead driving and was therefore of no use whatever in negotiating a left-hand turn at a Y-intersection, and, while I am aware that others have devised remote controls for such a mirror, most, if not all, of these prior constructions have not been what I would consider practical, mostly from the standpoint of the looseness and consequent vibration to which the mirror was subject with those controls, making it definitely unsafe to rely upon in its normal rear view position, many of the prior constructions being furthermore objectionable from the standpoint of their cost and the problems of installation they presented. With my invention, hand-operable control lever 13 is oscillatable about a substantially horizontal axis 14 relative to a supporting bracket 15 that is suitably secured to the underside of the instrument board 16, said lever being held quite firmly in any set position by circular ratchet plates 17–18 against vibration as well as shifting from a set position. This lever 13 is rigidly connected through one adjustable linkage 19 with one end of a rigid rocker arm 20 that is pivoted usually on a vertical axis intermediate its ends, as at 21, relative to a rigid supporting bracket 22, although in some installations, where the lower end of the mirror 7 is at such an elevation above or below the level of the center pivot 21 of the rocker arm 20, the rocker arm 20 may be disposed in a substantially vertical plane and is then, of course, pivoted on a substantially horizontal axis, the other end of the rocker arm 20 being connected in either case through another rigid adjustable linkage 23 with a rigid triangular-shaped bracket 24 rigidly secured to and extending forwardly from a generally U-shaped clip 25 rigidly adjustably secured to the back of the mirror 7. With this construction the bracket 22 is suitably secured to the body of the cab to the right of the windshield 26 with the pivotal connection 27 of link 23 with rocker arm 20 disposed substantially coincident with the vertical hinging axis e–f of the door so that when the door 8 is opened, as shown in dotted lines in FIG. 2, there will be very little, if any, push or pull on the link 23 that in turn would result in a corresponding change in the setting of the control lever 13 and thus necessitate the driver resetting the mirror 7 after the door is closed. Another feature of the construction is that, aside from the small holes drilled in the body for the screws for fastening bracket 22, the only other hole that need be drilled for extension of one link of the adjustable link connection 19 through the body to complete connection between the control lever 13 and the forward end of the rocker arm 20 at 28, the hole in the body being sealed suitably by a rubber grommet 29, as best appears in FIG. 6, the grommet 29 being cemented in place on the inside of the body by means of a rubber washer 30.

Figure 2:
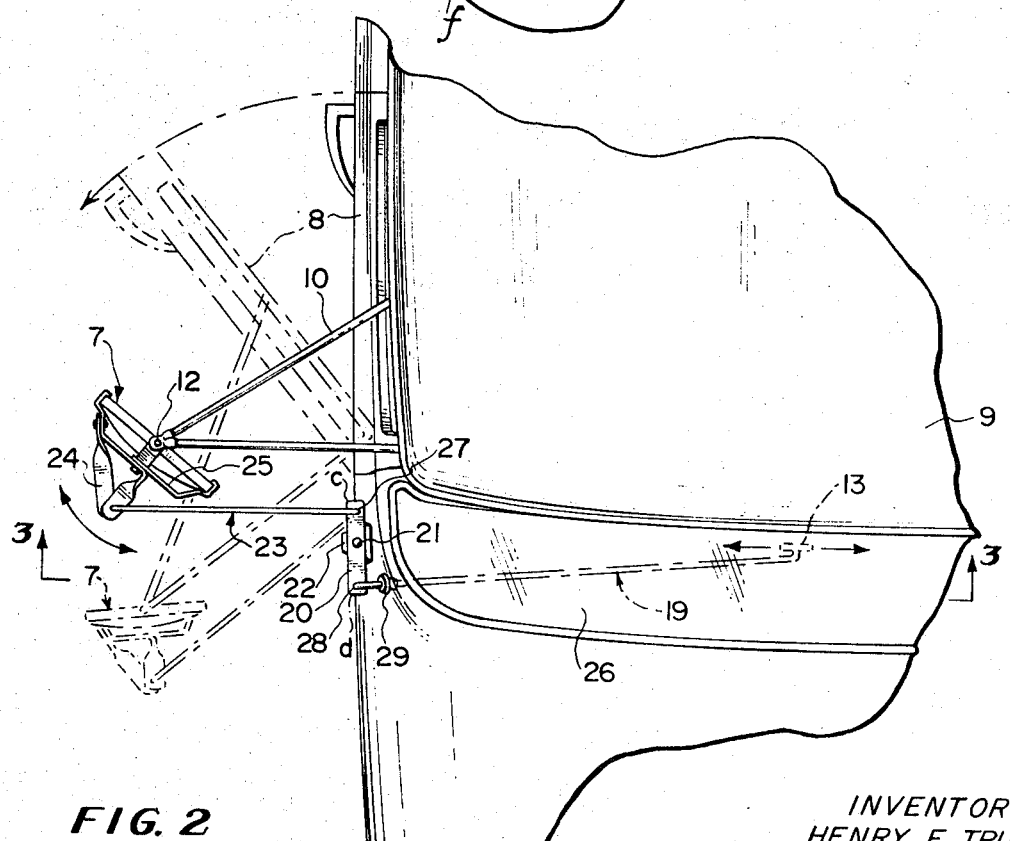
FIG. 2 is a plan view of FIG. 1, indicating in dotted lines how the opening of the right-hand door causes little or no change in the mirror adjustment.

The link connections 19 and 23 are shown in FIGS. 1 and 2 as single lengths of rods but, for adjustability, turnbuckles 31 and 32 are provided in the link connection 19, as shown in FIG. 3, threadedly adjustable between the ends of rods 33–35, thereby enabling very fine overall length adjustment of link connection 19 between the pivotal connection 36 at one end to control lever 13 and pivotal connection 28 at the other end to one end of rocker arm 20. In like manner, the turnbuckle 37 shown in FIG. 3 interconnects the adjacent threaded ends of rods 38 and 39 in order to enable very fine adjustment of the overall length of link connection 23 between the pivotal connection 40 at one end of link connection 23 with the bracket 24 and the pivotal connection 27 at the other end of this link connection. Lock nuts 41 are provided at both ends of each of the turnbuckles 31, 32, and 37, as shown in FIG. 3, to maintain the adjustments made at each of these three turnbuckles. An intermediate supporting bracket 42 located at approximately the mid-point of the adjustable link connection 19 and secured to the underside of the instrument board 16 has a lower extension 43 vertically adjustable with respect to bracket 42 and having a guide hole 44 therein for slidably receiving rod 34. This bracket, helps to make the link connection 19 rigid as it supports and guides the adjustable link 34 to eliminate sag.

If desired, a second control lever 13' may be provided to the left of the steering column, pivoted as at 14', similarly as lever 13, and having a link 45 connecting the lower end portions of the two control levers, so that the driver can operate whichever lever he prefers in adjusting the rear view mirror 7, the two levers being operable in tandem. The dot and dash line a–b locates the steering column approximately midway between the two control levers. Where two levers are provided there is no necessity for more than one pair of spring pressed restraining ratchet plates 17–18 like those shown in FIG. 4 which will now be described. It would only be in the event that it is found desirable to have additional restraint imposed upon the operation of either of the two levers that one would provide ratchet means 17–18 on both.

Ratchet plate 18 is fixed to bracket 15 by screws 46 and has radially extending ratchet teeth at 47 fitting in radially extending grooves 48 provided in the movable ratchet plate 17. A bolt 49 extending through registering holes in the two ratchet plates and through the control lever 13 (or 13') has a coiled compression spring 50 caged thereon and pressing against the lever 13 and plate 17 to press the two ratchet plates together to provide as much resistance as desired to pivotal movement of the lever 13 about the pivot 14 afforded by bolt 49 so that the mirror 7 can be adjusted easily enough and yet not so easily that there is any danger of its vibrating and possibly shifting its position once it has been set to the desired angle. The washer 51 behind the adjusting nut 52 on the outer end of the bolt 49 enables variation in the amount of resistance to pivotal movement of the control lever or levers, lever 13 being fastened by means of screws 53 to the movable ratchet plate 17 so as to turn the latter with respect to the fixed plate 18 whenever the lever 13 (or 13') is shifted to adjust the mirror 7.

In operation, it should be clear from the foregoing description that even if the pivotal connection at 27 between the link 23 and rocker arm 20 is not directly coaxial with the hinging axis of the door 8, the difference in the position of this pivot 27 in a fully open position of the door 8 and its closed position is easily within the range of compensation afforded by the ratchets 17–18, and, if desired, I may adjust the pivot 21 with respect to door 18 to locate the pivot 27 directly on the hinging axis before completing the installation of the link connection 19 between the rocker arm 20 and the control lever 13, such adjustment being along the line c–d shown in FIG. 2, or, instead of adjusting the pivot 21, independently of the bracket 22, I may adjust the bracket 22 along the line c–d. The mirror 7 is not apt to vibrate to any noticeable extent when the mirror adjustment of my invention has been properly installed, opportunity for play having been reduced to a minimum with the construction disclosed. The ratchet plates 17–18, besides reducing vibration of the mirror to a minimum, will maintain the mirror in a set position and also afford ample restraint so that the mirror setting is not apt to be tampered with when the truck is parked. Adjustability of the restraint imposed on the movement of the mirror afforded by the loading of the spring 50 to a greater or lesser extent by adjustment of nut 52 on bolt 49 is also an important feature of this invention as, of course, the desire is to enable the operator to make the adjustment of the mirror with the least amount of effort consistent with having certainty that the mirror maintains its set position, even though the truck may be driven over rough roads. When reaching a Y-intersection where a left-turn is to be made, the driver of the truck may with the present invention change from a normal rear-view setting to whatever angularity is necessary for the driver to check the oncoming traffic before entering the cross-road. It is a simple matter thereafter to reset the mirror again to its former position. Installation of the present invention in different makes and sizes of trucks is made easier by:

(a) the adjsutable turnbuckles 31, 33, and 37 to get the overall length between the lever 13 and mirror 7 exactly right;
(b) the use of the intermediate rocker arm interchangeably in either a horizontal position or an upright position, and
(c) by adjusting the rocker arm 20 in its horizontal position to get the pivot 27 as close as possible to alignment with the hinging axis of the door.

Obviously, there is nothing apt to get out of order with any part of the mirror operating means.

I claim:

1. In a rear view mirror assembly for a vehicle provided with vertically spaced mirror support brackets between which a substantially vertically disposed mirror is mounted at its upper and lower ends for pivotal movement about a substantially vertical axis, the impropement which comprises a mirror operating bracket fixed to said mirror, and extending therefrom, an elongated rigid rocker arm pivotally mounted intermediate its ends and in a fixed laterally spaced relation to said mirror and having one end pivotally connected by a rigid first push and pull link with said bracket, a second rigid push and pull link pivotally connected with the other end of said rocker arm and extending to a point remote from both said mirror and said rocker arm, and a manually operable rigid control lever pivotally mounted at said remote point and connected with said second link, whereby pivotal movement given said lever results in pivotal adjustment of said mirror, the vehicle having a door hingedly mounted on the vehicle body to swing about a substantially vertical axis, the mirror support brackets being carried on the outer side of said door and the rocker arm being mounted on the outside of said body adjacent the hinged edge of said door, said rocker arm being substantially horizontally disposed and having the first link pivotally connected thereto on an axis substantially coincident with the vertical hinging axis of said door.

2. The device described in claim 1, wherein one of said links is adjustable in length.

3. The device described in claim 1, wherein both of said links are adjustable in length.

4. A device as set forth in claim 1 including means frictionally resisting swinging movement of said control lever.

5. A device as set forth in claim 1 including a second manual control lever pivotally mounted in laterally spaced substantially parallel relation to the first named control lever and link connected therewith for operation in tandem.

6. A device as set forth in claim 1 including a second manual control lever pivotally mounted in laterally spaced substantially parallel relation to the first named control lever and link connected therewith for operation in tandem, at least one of said levers having means frictionally resisting swinging movement thereof.

7. A device as set forth in claim 1 including means frictionally resisting swinging movement of said control lever, said means comprising a pair of concentric ratchet plates disposed in meshing engagement, one fixed and the other rotatable with said control lever relative to the fixed one, and spring means yieldably holding said plates pressed together.

8. A device as set forth in claim 1 including means frictionally resisting swinging movement of said control lever, said means comprising a pair of concentric ratchet plates disposed in meshing engagement, one fixed and the other rotatable with said control lever relative to the fixed one, and spring means yieldably holding said plates pressed together, said spring means having means for adjusting the same to increase or decrease the spring pressure.

9. A device as set forth in claim 1 including a second manual control lever pivotally mounted in laterally spaced substantially parallel relation to the first named control lever and link connected therewith for operation in tandem, at least one of said levers having means frictionally resisting swinging movement thereof, said means comprising a pair of concentric ratchet plates disposed in meshing engagement, one fixed and the other rotatable with said control lever relative to the fixed one, and spring means yieldably holding said plates pressed together.

10. A device as set forth in claim 1 including a second manual control lever pivotally mounted in laterally spaced substantially parallel relation to the first named control lever and link connected therewith for operation in tandem, at least one of said levers having means frictionally resisting swinging movement thereof, said means comprising a pair of concentric ratchet plates disposed in meshing engagement, one fixed and the other rotatable with said control lever relative to the fixed one, and spring means yieldably holding said plates pressed together, said spring means having means for adjusting the same to increase or decrease the spring pressure.

11. In a rear view mirror assembly for a vehicle provided with vertically spaced mirror support brackets, between which a substantially vertically disposed mirror is mounted at its upper and lower ends for pivotal movement about a substantially vertical axis, the improvement which comprises a mirror operating bracket fixed to said mirror and extending therefrom substantially horizontally, an elongated rigid rocker arm pivotally mounted intermediate its ends in a fixed laterally spaced relation to said mirror and having one end pivotally connected by a first push and pull link with said bracket, a second rigid push and pull link pivotally connected with the other end of said rocker arm and extending to a point remote from both said mirror and said rocker arm, and a manually operable rigid control lever pivotally mounted at said remote point and connected with said second link, whereby pivotal movement given said lever results in pivotal adjustment of said mirror, the vehicle having a door hingedly mounted on the vehicle body to swing about a substantially vertical axis, the mirror support brackets being carried on the outer side of said door, and the rocker arm being mounted on the outside of said body adjacent the hinged edge of said door and so disposed with respect to the hinging axis of the door that said rocker arm does not change its position in the opening and closing of the door and accordingly the position of the mirror with respect to its axis of adjustment remains substantially unchanged in the opening and closing of said door.

References Cited

UNITED STATES PATENTS

| 1,494,563 | 5/1924 | Pelton | 74—503 |
| 2,158,323 | 5/1939 | Ericson | 74—503 |
| 2,303,586 | 12/1942 | Snell | 74—503 |
| 2,696,142 | 12/1954 | Langford | 74—501 |
| 3,059,790 | 10/1962 | Augustus | 74—501X |
| 3,245,283 | 4/1966 | VanNoord | 74—501 |
| 3,261,226 | 7/1966 | Dent | 74—501 |

FOREIGN PATENTS

| 1,091,887 | 10/1960 | Germany | 74—96 |

MANUEL A. ANTONAKAS, Primary Examiner

U.S. Cl. X.R.

74—25, 96